(12) United States Patent
Martin

(10) Patent No.: US 9,002,260 B2
(45) Date of Patent: Apr. 7, 2015

(54) REPEATER SYSTEM FOR EXTENDED CELL COVERAGE

(75) Inventor: Andrew C. Martin, Mt Evelyn (AU)

(73) Assignee: Telstra Corporation Limited, Melbourne (AU)

( * ) Notice: Subject to any disclaimer, the term of this patent is extended or adjusted under 35 U.S.C. 154(b) by 1013 days.

(21) Appl. No.: 12/601,076

(22) PCT Filed: Dec. 13, 2007

(86) PCT No.: PCT/AU2007/001932
§ 371 (c)(1),
(2), (4) Date: Jun. 9, 2010

(87) PCT Pub. No.: WO2008/141355
PCT Pub. Date: Nov. 27, 2008

(65) Prior Publication Data
US 2011/0117834 A1    May 19, 2011

(30) Foreign Application Priority Data

May 22, 2007  (AU) ................................ 2007902731

(51) Int. Cl.
H04B 7/14       (2006.01)
H04B 7/26       (2006.01)
H04B 7/155      (2006.01)
H04W 16/26      (2009.01)

(52) U.S. Cl.
CPC .......... *H04B 7/2606* (2013.01); *H04B 7/15507* (2013.01); *H04W 16/26* (2013.01)

(58) Field of Classification Search
CPC .......... H04B 7/2606; H04B 3/36; H04B 3/38; H04W 88/04; H04W 84/047
USPC ............................................................ 455/7
See application file for complete search history.

(56) References Cited

U.S. PATENT DOCUMENTS

| | | | |
|---|---|---|---|
| 6,404,775 B1 * | 6/2002 | Leslie et al. | 370/466 |
| 6,445,904 B1 * | 9/2002 | Lovinggood et al. | 455/7 |
| 6,785,510 B2 * | 8/2004 | Larsen | 455/11.1 |
| 6,839,539 B2 * | 1/2005 | Durrant et al. | 455/11.1 |
| 7,035,221 B2 * | 4/2006 | Furukawa et al. | 370/238 |
| 7,200,392 B2 * | 4/2007 | Kennedy et al. | 455/423 |
| 7,324,471 B2 * | 1/2008 | Kim | 370/320 |
| 7,379,757 B2 * | 5/2008 | Kennedy et al. | 455/562.1 |
| 7,412,207 B2 * | 8/2008 | Poykko | 455/11.1 |
| 7,429,951 B2 * | 9/2008 | Kennedy et al. | 342/465 |
| 7,460,831 B2 * | 12/2008 | Hasarchi | 455/15 |
| 7,526,247 B2 * | 4/2009 | Baker et al. | 455/11.1 |
| 7,546,084 B2 * | 6/2009 | Kennedy et al. | 455/9 |
| 7,567,786 B2 * | 7/2009 | Bjerede | 455/196.1 |
| 7,623,872 B2 * | 11/2009 | Kennedy et al. | 455/456.1 |

(Continued)

FOREIGN PATENT DOCUMENTS

| | | |
|---|---|---|
| EP | 0977380 A1 | 2/2000 |
| EP | 1501216 A1 | 1/2005 |
| WO | WO 2004098081 A1 * | 11/2004 |

*Primary Examiner* — Hai V Nguyen
(74) *Attorney, Agent, or Firm* — Wolf, Greenfield & Sacks, P.C.

(57) ABSTRACT

A repeater system for extending cell coverage, including a frequency band translation repeater for transmitting radio frequency (RF) signals to and receiving RF signals from a base station and translating between the frequency band of THE RF signals and a different frequency band for RF transmission directly between the repeater and user equipment.

11 Claims, 5 Drawing Sheets

(56) References Cited

U.S. PATENT DOCUMENTS

| | | | |
|---|---|---|---|
| 7,627,327 B2 * | 12/2009 | Kennedy et al. | 455/456.1 |
| 7,656,285 B2 * | 2/2010 | Hansen et al. | 340/500 |
| 7,715,853 B1 * | 5/2010 | Frerking et al. | 455/456.4 |
| 7,738,836 B2 * | 6/2010 | Alles et al. | 455/9 |
| 7,778,596 B2 * | 8/2010 | Anderson et al. | 455/11.1 |
| 7,778,608 B2 * | 8/2010 | Kennedy et al. | 455/67.11 |
| 7,796,546 B2 * | 9/2010 | Lee et al. | 370/315 |
| 7,809,047 B2 * | 10/2010 | Kummetz | 375/211 |
| 7,885,344 B2 * | 2/2011 | Nakayama et al. | 375/260 |
| 7,924,751 B2 * | 4/2011 | Dean | 370/279 |
| 7,925,205 B2 * | 4/2011 | Kennedy et al. | 455/11.1 |
| 7,945,212 B2 * | 5/2011 | Kennedy et al. | 455/67.11 |
| 8,000,701 B2 * | 8/2011 | Dawson | 455/433 |
| 8,000,702 B2 * | 8/2011 | Dawson et al. | 455/433 |
| 8,019,339 B2 * | 9/2011 | Dawson | 455/433 |
| 8,019,836 B2 * | 9/2011 | Elliott et al. | 709/220 |
| 8,090,384 B2 * | 1/2012 | Alles et al. | 455/456.1 |
| 8,150,421 B2 * | 4/2012 | Ward et al. | 455/456.5 |
| 8,175,620 B2 * | 5/2012 | Carlson et al. | 455/456.6 |
| 8,213,957 B2 * | 7/2012 | Bull et al. | 455/456.1 |
| 8,254,966 B2 * | 8/2012 | Carlson et al. | 455/456.5 |
| 8,265,637 B2 * | 9/2012 | Karabinis | 455/446 |
| 8,311,018 B2 * | 11/2012 | Carlson et al. | 370/336 |
| 8,498,577 B2 * | 7/2013 | Achkar et al. | 455/63.4 |
| 8,600,297 B2 * | 12/2013 | Ketchum et al. | 455/13.2 |
| 8,625,658 B2 * | 1/2014 | Kummetz | 375/211 |
| 8,660,536 B1 * | 2/2014 | Pogue et al. | 455/411 |
| 8,665,774 B2 * | 3/2014 | Dean | 370/315 |
| 8,676,143 B2 * | 3/2014 | Thomas et al. | 455/296 |
| 2002/0042290 A1 * | 4/2002 | Williams et al. | 455/562 |
| 2004/0157561 A1 * | 8/2004 | Akerberg | 455/67.11 |
| 2005/0215193 A1 * | 9/2005 | Kummetz | 455/1 |
| 2006/0030262 A1 * | 2/2006 | Anderson et al. | 455/21 |
| 2006/0084379 A1 * | 4/2006 | O'Neill | 455/25 |
| 2006/0205341 A1 * | 9/2006 | Runyon | 455/11.1 |
| 2006/0205342 A1 * | 9/2006 | McKay et al. | 455/11.1 |
| 2006/0205343 A1 * | 9/2006 | Runyon et al. | 455/11.1 |
| 2007/0066345 A1 * | 3/2007 | Hwang et al. | 455/553.1 |
| 2008/0057862 A1 * | 3/2008 | Smith | 455/11.1 |
| 2008/0311848 A1 * | 12/2008 | Proctor et al. | 455/9 |
| 2010/0273504 A1 * | 10/2010 | Bull et al. | 455/456.1 |
| 2010/0297994 A1 * | 11/2010 | Law et al. | 455/435.2 |
| 2011/0002367 A1 * | 1/2011 | Kummetz | 375/211 |
| 2011/0117834 A1 * | 5/2011 | Martin | 455/7 |
| 2012/0184204 A1 * | 7/2012 | Kazmi et al. | 455/7 |
| 2012/0218156 A1 * | 8/2012 | Mohammadian | 343/730 |
| 2012/0307715 A1 * | 12/2012 | Maeda et al. | 370/315 |
| 2012/0320782 A1 * | 12/2012 | Seo et al. | 370/252 |
| 2013/0039254 A1 * | 2/2013 | Kim et al. | 370/312 |
| 2013/0273952 A1 * | 10/2013 | Srikanteswara et al. | 455/509 |

* cited by examiner

REPEATER SYSTEM FOR EXTENDED CELL COVERAGE

FIELD

The present invention relates to a repeater system that can be used to extend cell coverage of a public land mobile telecommunications system.

BACKGROUND

The base stations of public land mobile telecommunications networks each have a radio range determined by the characteristics of their transmitting and receiving equipment and their location. The range determines the coverage area of the cell of the base station in which user equipment (LIE), such as a telephone handset, is able to establish a communications channel with the base station. Accordingly, the coverage of the network is determined by both the selection and position of the base station of the network. Coverage in remote areas is always problematic, as it is generally cost prohibitive to install a base station in an area where usage of the network is very low. Accordingly, alternatives need to be adopted in order to extend network service to users in remote locations.

One alternative for remote locations is the use of satellite telecommunications infrastructure. Satellite telephones and access charges to satellite networks are however costly. Another alternative which has been used in Australia is to place mobile handset equipment at the edge of a mobile network's coverage, and then run a fixed copper line from the handset to terminal equipment at the remote location, e.g. the user's home. This gives rise to disadvantages associated with installation and maintenance of the copper lines for users, together with the cost of having the dedicated phones placed at the edge of the network.

Two other alternatives involve the use of radio frequency (RF) repeater systems. These are:
  (i) a RF repeater at the edge of the coverage of the network so as to directly retransmit or relay the RF signals to and from the donor base station of the cell and the UE at a remote location outside of the coverage area. This, however, introduces the problem of feedback between the receiving and transmitting antennas of the repeater. Attempts have been made to reduce this feedback by introducing echo cancellers to remove the original signal at the repeater from the retransmitted signal, but this has proved expensive and feedback still occurs, such as from reflections from transport vehicles moving within the area.
  (ii) a two stage RF translation system including a RF translator located at the donor base station of the cell to translate the RF signals from the donor base station to a different carrier frequency to that of the network for transmission to a RF repeater located on the edge of the coverage area. The repeater in turn then translates the received RF signals from the RF translator back to the original carrier frequency for transmission to the UE. RF transmission from the UE is similarly translated at the repeater site to communicate with the RF translator and hence to the donor base station. This however is a more expensive solution than (i) and suffers the disadvantage of having to install and maintain additional equipment at the base station as well infrastructure at the repeater site.

Accordingly, it is desired to address the above, or at least provide a useful alternative.

SUMMARY

In accordance with the present invention there is provided a repeater system for extending cell coverage, including a frequency band translation repeater for transmitting radio frequency (RF) signals to and receiving RF signals from a base station and translating between the frequency band of said RF signals and a different frequency band for RF transmission directly between the repeater and user equipment.

The present invention also provides a repeater system, including:
  a donor port for a frequency band of a base station of a mobile telecommunications network;
  a service port for a different frequency band, the different frequency band including a carrier frequency for communication with user equipment of the network; and
  a repeater circuit for converting signals on the donor port and the service port between the bands.

The present invention also provides a method of extending cell coverage for a Universal Mobile Telecommunications System (UMTS) network, including:
  retransmitting signals on the UMTS operating band of the network as signals on one or more different UMTS operating bands; and
  retransmitting signals of the one or more different UMTS operating bands as signals on the operating band of the network.

DESCRIPTION OF DRAWINGS

Preferred embodiments of the present invention are hereinafter described, by way of example only, with reference to the accompanying drawings, wherein.

DETAILED DESCRIPTION

Figure 1:
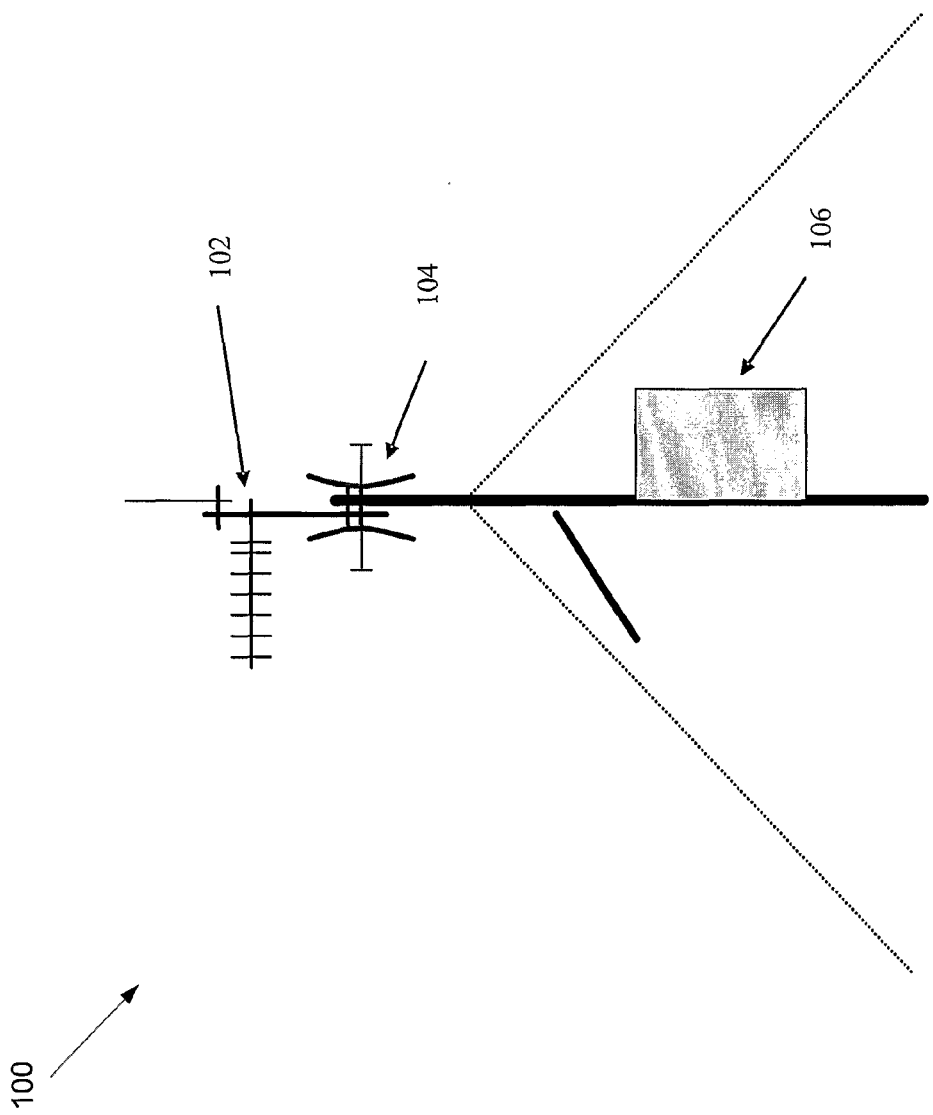
FIG. 1 is a diagram of a preferred embodiment of a repeater system in accordance with the present invention.

A repeater system 100, as shown in FIG. 1, can be placed within the area of coverage of an existing telecommunications network to extend the coverage of that network without requiring any modification to be made to the standard user equipment (UE) that is normally used for that network. Cell coverage can be considerably extended outside of and beyond the existing range of the network by placing the system 100 at the edge of coverage of a cell of the network. The system 100 includes a first antenna 102 for the carrier frequency of the network, a second antenna 104 for a different carrier frequency on which the user equipment can also operate, and a repeater 106 connected to the antennas 102 and 104 so as to translate between the frequency bands of the two carrier frequencies.

The repeater system 100 is a single stage translation system and is particularly applicable to Universal Mobile Telecommunications System (UMTS) networks, i.e. 3G Networks, which operate according to the standards of the $3^{rd}$ Generation Partnership Project (3GPP). The 3GPP has established standard operating bands for all user equipment, i.e. mobile terminals. The operating bands are set out in the table below.

| Operating Band | UL Frequencies UE transmit, Node B receive | DL frequencies UE receive, Node B transmit |
|---|---|---|
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |
| VII | 2500-2570 MHz | 2620-2690 MHz |
| VIII | 880-915 MHz | 925-960 MHz |
| IX | 1749.9-1784.9 MHz | 1844.9-1879.9 MHz |
| X | 1710-1770 MHz | 2110-2170 MHz |

The radio access networks (RANs) provided by the base stations of UMTS mobile networks accordingly use a selected one of the operating bands that is normally determined by the telecommunications provider. For example, in Australia two networks provided by different service providers, e.g. carriers, are UMTS networks that operate using Band I. For these networks the carrier frequencies are referred to as being 2100 MHz. Another network provided in Australia, however, is a UMTS network that operates using Band V and is referred to as using a carrier frequency of 850 MHz. Operating on the 850 MHz band provides greater reach and penetration thereby extending the range for each base station on the network. For simplicity of description, the repeater system 100 is hereinafter described as operating between Bands I and V, although the repeater system could be used to translate between any two or more of the operating bands, provided the bands on one side (i.e. port 202) of the repeater 106 are different to those on the other side (i.e. port 204) of the repeater.

Figure 4:
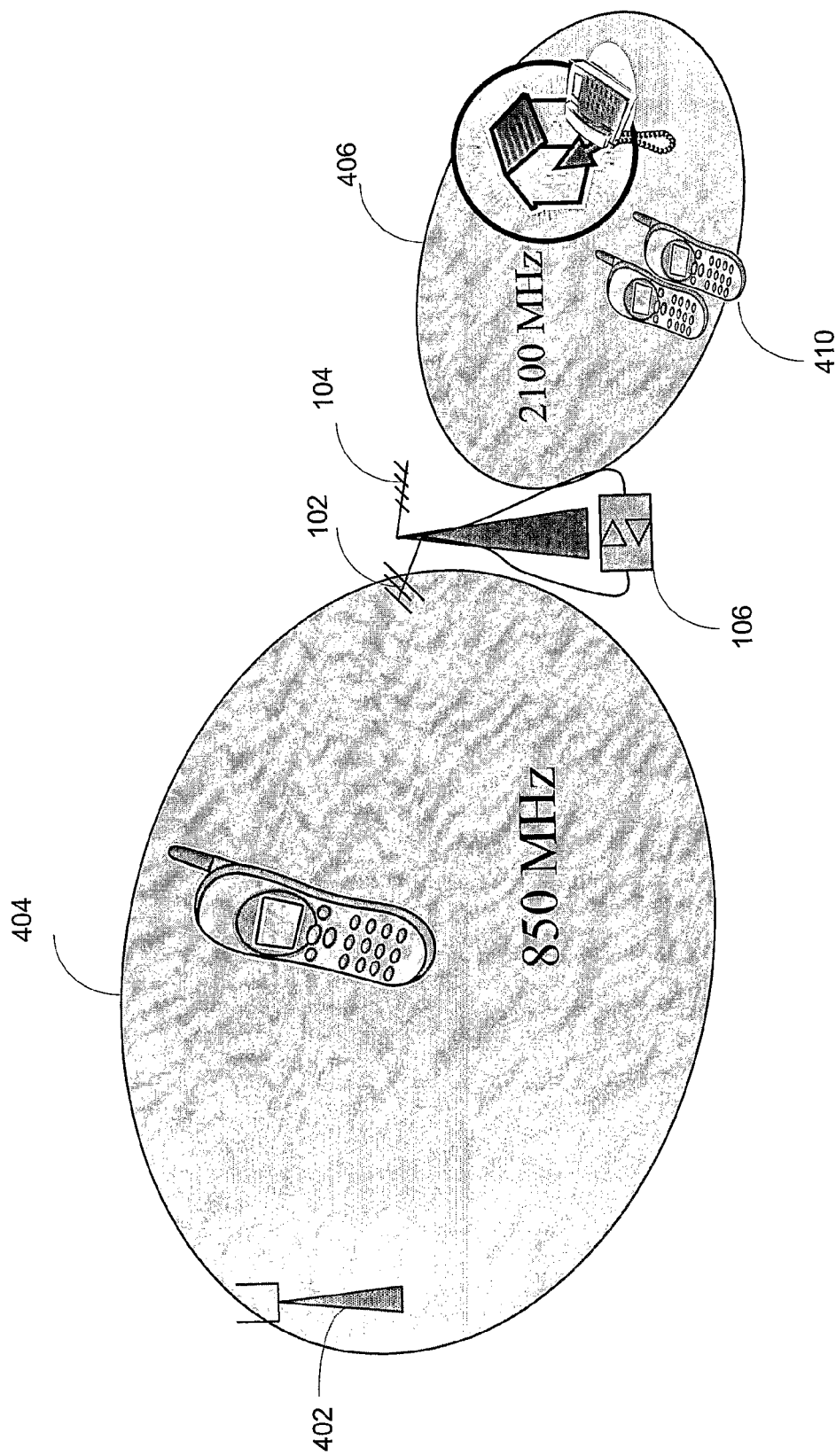
FIG. 4 is a schematic illustration showing use of the system to extend cell coverage.
Figure 5:
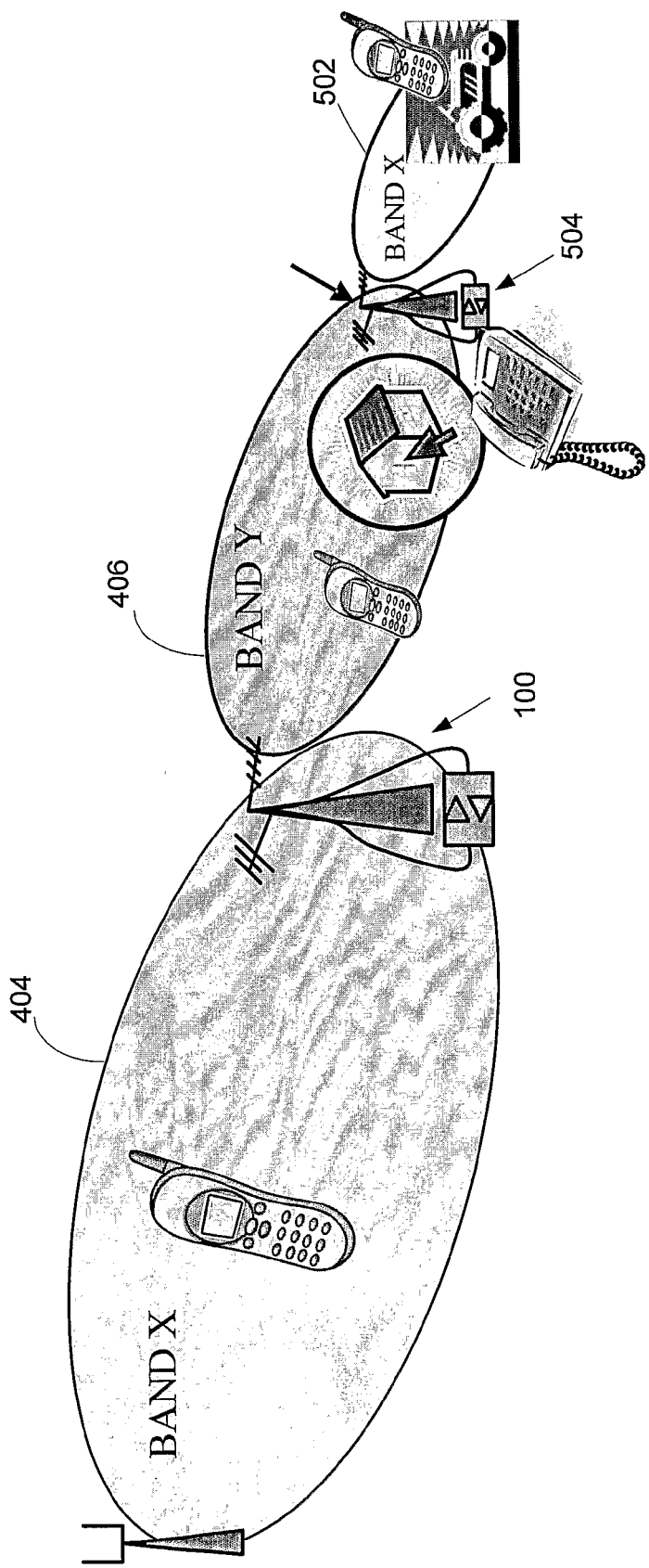
FIG. 5 is a schematic diagram illustrating use of two embodiments of the system to extend cell coverage.

To shift between Band V and Band I, the first antenna 102 is configured to receive and transmit from a first band at 850 MHz, and is a standard base station antenna of the existing 850 MHz network. The first antenna 102 is placed within the range of coverage of a cell 404 of the 850 MHz network provided by an 850 MHz base station 402, as shown in FIG. 4. The repeater 106 has one port 202 connected to the antenna 102 and is placed in a shelter at the base of the antenna structure. A second port 204 of the repeater 106 is connected to a 2100 MHz antenna 104 which is configured and positioned to establish a new and extended cell 406 operating on the 2100 MHz band. The second antenna 104 may be a Yagi or Omnidirectional antenna.

Figure 2:
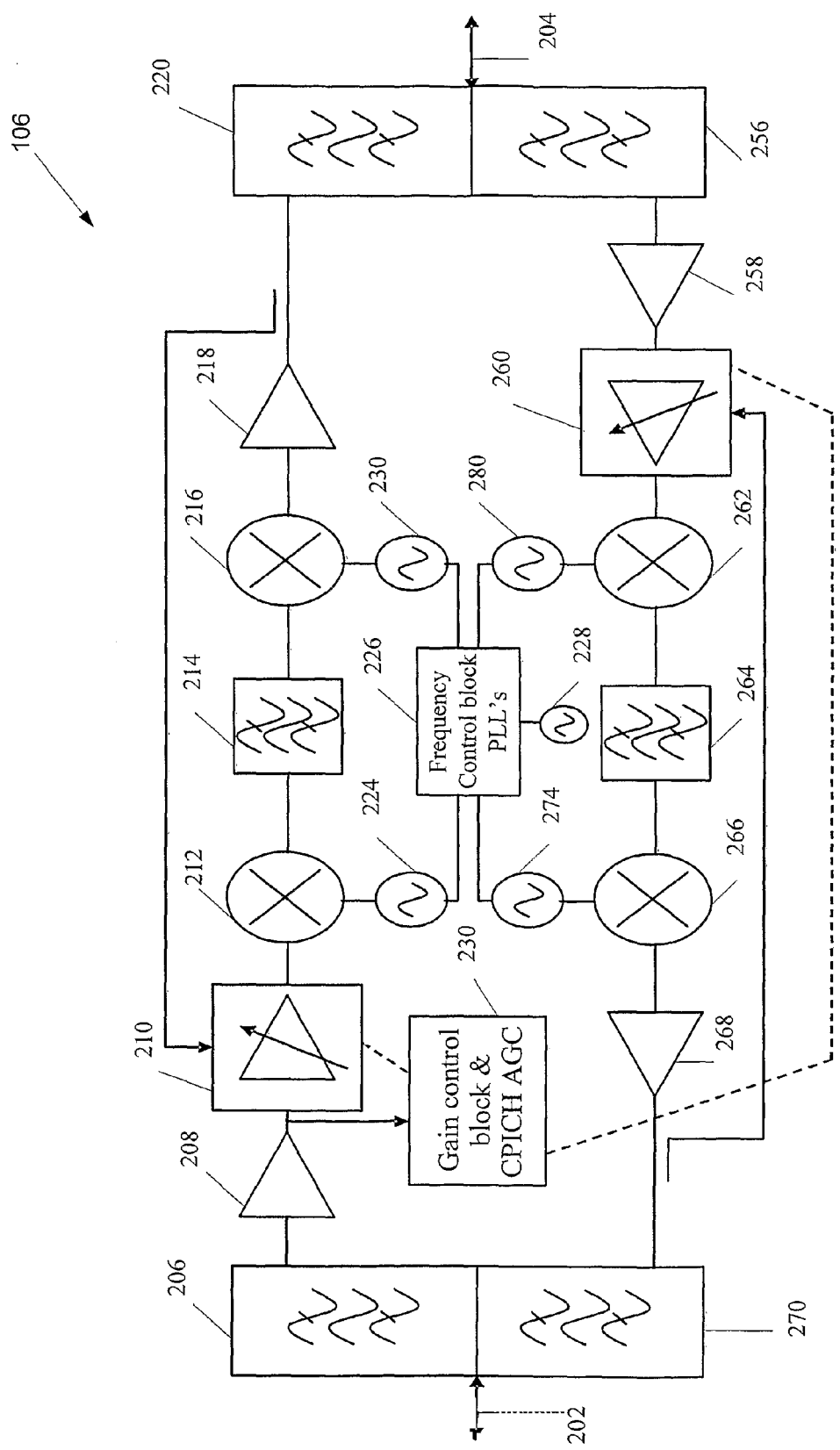
FIG. 2 is a block circuit diagram of a repeater of the system.

The repeater 106, as shown in FIG. 2, has a donor port 202 that provides an 835 MHz uplink signal and an 880 MHz downlink signal for the first antenna 102. A service port 204 of the repeater 106 provides a 1950 MHz uplink signal and a 2140 MHz downlink signal for the second antenna 104.

The circuitry for the downlink part of the repeater 106 includes a duplexer for the donor port 202 that includes a downlink part 206 with an 880 MHz band pass filter. This is connected to a downlink low noise amplifier 208. The output of the amplifier 208 is connected to a variable gain amplifier 210 that can be adjusted by a gain control circuit 230. The gain control may be automatic based on the power level of the common pilot channel (CPICH) of the RAN signals. A first superheterodyne mixer 212 receives the output of the amplifier 210 and produces an intermediate frequency (IF). The intermediate frequency is selected by a first voltage controlled oscillator (VCO) 224, that in turn is controlled by a phase locked loop (PLL) circuit 226. The PLL circuit 226 is driven by a high stability reference oscillator 228. The PLL circuit 226 also includes a control microprocessor for controlling other circuit components of the repeater 106.

An intermediate frequency terminal filter 214 receives the output of the first mixer 212. The filter 214 is a SAW filter that is configured to provide filtering at the intermediate frequency to achieve single channel filtering, i.e. for a UMTS channel of 5 MHz. The bandwidth of the SAW filter 214 can be expanded by multiples of 5 MHz so as to allow additional channels to be retransmitted by the repeater 106, if desired. A second mixer 216 converts the filtered intermediate frequency signal to the downlink service port frequency of 2140 MHz. The output of the mixer 216 is connected to a power amplifier 218 which drives a duplexer for the service port 204 that includes a downlink part 220 with a 2140 MHz band pass filter. The second mixer 216 is driven by a second voltage controlled oscillator (VCO) 230 that is also controlled by the PLL 226. The output of the power amplifier 218 provides a feedback signal to the variable gain amplifier 210 for control purposes.

The circuitry is effectively repeated for the uplink part of the repeater 106. An uplink part 256 of the service port duplexer includes a band pass filter for 1950 MHz. The output of this filter is fed to a second low noise amplifier 258, which in turn is connected to a second variable gain amplifier 260. The output of the amplifier 260 is connected to a third mixer 262 which down converts the up link frequency of the service port 204 to the intermediate frequency. The mixer 262 is driven by a third VCO 280. The down converted signal is fed to a second intermediate frequency filter 264 that is the same as the first IF filter 214.

The output of the second filter 264 is passed to a fourth mixer 266 that is driven by a fourth VCO 274. The mixer 266 produces a signal at the 835 MHz uplink frequency. The signal is amplified by a second power amplifier 268, the output of which is fed to the uplink part 270 of the duplexer of the donor port 202. The gain control circuit 230 is also able to control the gain of the second variable gain amplifier 260 based on the level obtained from the CIPCH (the common pilot channel).

Figure 3:
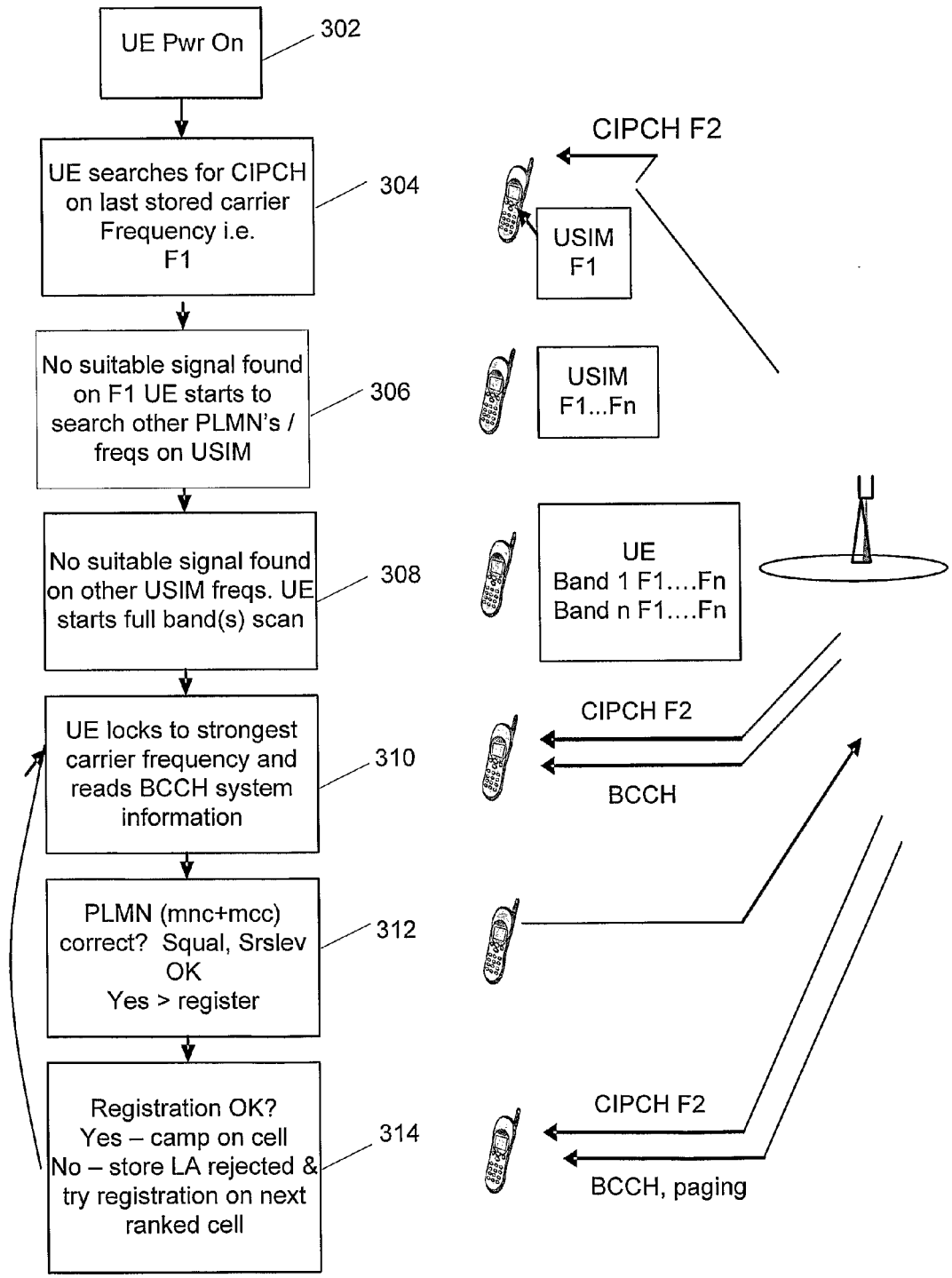
FIG. 3 is a flow diagram of a cell selection process performed by user equipment when using the system.

The user equipment 410 for a UMTS network is able to move between a cell 404 of the network, and the extended cell 406 by using the frequency and channel selection control logic that is built into the user equipment 410. For example, when a user terminal 410 of the network is switched on within the extended cell 406 (302), as shown in FIG. 3, the UE 410 first searches for the common pilot channel (CIPCH) on the last stored carried frequency, i.e. a frequency of Band V of the network (304). If no suitable signal is found on that carrier frequency, the UE starts to search for other public land mobile networks at frequencies stored in the terminal's UMTS subscribed identity module (SIM) (306). If no suitable signal is found on other SIM frequencies, the UE begins to scan all of the UMTS operating bands (308). The UE locks onto the strongest carrier frequency found and reads information available from a broadcast control channel (BCCH) (310) of the UMTS network location. Accordingly, it will locate the repeated signal of the 850 MHz network on the 2100 MHz band and then using data available on the BCCH will seek to register with the network (312). The process looks for a match between the Mobile Network Code (MNC) and Mobile Country Code (MCC) of the PLMN received and that stored in the USIM. It also looks to determine if the Signal Quality Level (Squal) and Signal Receive Level (Srslev) received are sufficient before successfully registering with the PLMN. If registration is successful then the UE 410 will camp on the extended cell 406 at the 2100 MHz band which effectively means it is camping on the cell 404 (314). If registration is unsuccessful, then the UE 410 will record the LA (Location Area) of the rejected cell and simply move to the next strongest carrier frequency and attempt the registration process again.

A UE 410 can also move between the cells 404 and 406 by relying on the measurements the UE takes regarding the signals from neighbouring cells, notwithstanding that they are of different bands. Neighbouring cells are ranked on quality by the UE 410 based on data obtained from the CIPCH and the ranking can trigger re-selection to a different cell. When this occurs the UE 410 will move to the different cell.

In addition to extending cell coverage to one area, the repeater system 100 can also be used to extend the extended cell 406 to a further extended cell 502 at a different band. This can be done using another repeater system 504 that is essentially the same as the first repeater system 100 but which translates between the extended band of the cell 406 to another band for the further extended cell 502. This other band may be the same as the band of the network of the first cell 404.

In addition to extending cell coverage to a new location, the repeater system 100 can also be used to provide extended coverage within an existing cell 404 at different frequencies or a different operating band. For example, the repeater system 100 could be used at an airport to translate between the band of a network that covers the airport to the band of a visitor's UE that they use at home. The repeater system 100 could also be used to improve coverage in poor coverage areas, such as within a building. This can be done by mounting the system 100 within windows or specific areas to reduce black spots. Also, with interference that might be created by adjacent cells of a UMTS network, the repeater system 100 could be used to improve access to or performance of the High Speed Downlink Packet Access (HSDPA) system. The repeater system 100 could also be used to provide selective repeating for the bands of selected carriers (i.e. service providers) to certain locations in circumstances where a carrier only operates on one band. UEs could also be locked to a single band or a repeated band only and then coverage provided in an area by the repeater system 100 specifically for those UEs. This can be particularly useful for emergency services where quick and high reliability local coverage may be required and network capacity controlled. Coverage enhancement and signal quality enhancement can also be provided for particular hot spot areas with small coverage by installing the repeater system 100 at the hot spot.

Many modifications will be apparent to those skilled in the art without departing from the scope of the present invention herein described with reference to the accompanying drawings. For example, one antenna for two or more bands can be connected to both the donor port 202 and the service port 204 rather than having dedicated antennas for each port.

The invention claimed is:

1. A repeater system for extending cell coverage, comprising:
   a standard base station of a Universal Mobile Telecommunications System (UMTS) based network operating on a first frequency band;
   a base station antenna wirelessly transmitting and receiving radio frequency (RF) signals directly from and to said standard base station of said UMTS based network;
   a repeater, including:
      a donor port connected to said base station antenna, said donor port being for said first frequency band of said base station and of said network;
      a service port for a different second frequency band of said network, the different second frequency band including a carrier frequency for direct communication with standard user equipment of said network; and
      a repeater circuit translating said RF signals on the donor port and the service port between the first frequency band of said RF signals and said different second frequency band for wireless RF transmission directly between the repeater and said standard user equipment; and
   said user equipment which scans all UMTS operating bands to locate said RF signals of the second frequency band and register with said network,
   wherein said first frequency band and said second frequency band are frequencies of a single UMTS based network and wherein the coverage of said network for said standard user equipment of said network is extended by the repeater system.

2. A repeater system as claimed in claim 1, wherein the system extends an area of said cell coverage of said base station to another area.

3. A repeater system as claimed in claim 2, including another of said repeater configured to transmit and receive said RF signals at said different second frequency band and to translate between said different second frequency band and another frequency band of said network for RF transmission directly between said another of said repeater and user equipment of said network.

4. A repeater system as claimed in claim 3, wherein said another frequency band is the frequency band of said base station.

5. A repeater system as claimed in claim 2, wherein the repeater circuit includes a downlink circuit for translation from the first band to the second band, and an uplink circuit for translation from the second band to the first band.

6. A repeater system as claimed in claim 1, wherein the system provides coverage at said different second frequency band within an area of said cell coverage of said base station.

7. A repeater system as claimed in claim 6, wherein said coverage at said different second frequency band is for said user equipment which does not operate at said first frequency band of said base station.

8. A repeater system as claimed in claim 7, wherein the repeater circuit includes a downlink circuit for translation from the first band to the second band, and an uplink circuit for translation from the second band to the first band.

9. A repeater system as claimed in claim 6, wherein the repeater circuit includes a downlink circuit for translation from the first band to the second band, and an uplink circuit for translation from the second band to the first band.

10. A repeater system as claimed in claim 1, wherein the repeater circuit includes a downlink circuit for translation from the first band to the second band, and an uplink circuit for translation from the second band to the first band.

11. A repeater system as claimed in claim 10, wherein the downlink circuit and the uplink circuit include a gain amplifier controlled based on a power level of the common pilot channel of signals received on the donor port and the service port, respectively.

\* \* \* \* \*